(12) United States Patent
Park et al.

(10) Patent No.: US 8,579,343 B2
(45) Date of Patent: Nov. 12, 2013

(54) ROBOT ACTUATOR AND HUMANOID ROBOT HAVING THE SAME

(75) Inventors: Kang Min Park, Yongin-si (KR); Ja Woo Lee, Seoul (KR); Yong Jae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 138 days.

(21) Appl. No.: 12/860,346

(22) Filed: Aug. 20, 2010

(65) Prior Publication Data
US 2011/0067518 A1 Mar. 24, 2011

(30) Foreign Application Priority Data
Sep. 18, 2009 (KR) .................. 10-2009-0088541

(51) Int. Cl.
*B25J 15/00* (2006.01)
(52) U.S. Cl.
USPC ............. 294/111; 294/213; 74/89.33; 901/38
(58) Field of Classification Search
USPC .......... 294/111, 213, 200; 74/490.04, 490.05, 74/89.32, 89.33; 901/38
See application file for complete search history.

(56) References Cited

U.S. PATENT DOCUMENTS

| | | | | |
|---|---|---|---|---|
| 3,974,706 A | * | 8/1976 | Danko, Jr. ................... | 74/89.32 |
| 4,246,661 A | * | 1/1981 | Pinson ........................... | 623/25 |
| 5,108,140 A | * | 4/1992 | Bartholet ...................... | 294/106 |
| 5,329,825 A | * | 7/1994 | Askins ........................ | 74/89.32 |
| 5,732,592 A | * | 3/1998 | Parker ............................ | 74/89 |
| 6,244,644 B1 | * | 6/2001 | Lovchik et al. ............... | 294/111 |
| 6,817,641 B1 | * | 11/2004 | Singleton, Jr. ............... | 294/106 |
| 6,969,199 B2 | * | 11/2005 | Moshammer .................. | 384/57 |
| 7,481,126 B2 | * | 1/2009 | Las Navas Garcia ........ | 74/89.23 |

* cited by examiner

*Primary Examiner* — Dean Kramer
(74) *Attorney, Agent, or Firm* — Staas & Halsey LLP (57) ABSTRACT

Disclosed herein are a robot actuator and a humanoid robot having the same. The robot actuator includes a rotation driving source, a ball screw member including a ball screw part connected to the rotation driving source and a nut part connected to the ball screw part, a guide member separated in parallel from the ball screw part, a slider member movably supported by the guide member, and a connection member connecting the slider member and the nut part to move the slider member in connection with movement of the nut part, and the connection member is relatively movably connected to at least one of the nut part and the slider member. Therefore, efficiency in force reflection and back-drivability of the actuator is improved.

13 Claims, 10 Drawing Sheets

ROBOT ACTUATOR AND HUMANOID ROBOT HAVING THE SAME

CROSS-REFERENCE TO RELATED APPLICATIONS

This application claims the benefit of Korean Patent Application No. 2009-0088541, filed on Sep. 18, 2009 in the Korean Intellectual Property Office, the disclosure of which is incorporated herein by reference.

BACKGROUND

1. Field

Example embodiments relate to a robot actuator, in which efficiency in force reflection and back-drivability is improved, and a humanoid robot having the same.

2. Description of the Related Art

In general, robots have increasingly been used in all industries, and particularly, research and development of humanoid robots have been accelerated. In order to allow a humanoid robot to conduct operations including household affairs on behalf of humans, achievement of various motions is important.

In order to achieve these various motions, the humanoid robot includes a joint driving apparatus to drive a joint in various directions.

The joint driving apparatus includes a plurality of actuators. Each of the actuators includes a motor, a driving force transmission unit to convert driving force of the motor into a rectilinear motion to be transmitted to a slider. The slider may move in the lengthwise direction of the actuator through the driving force transmission unit.

The driving force transmission unit includes a ball screw and a linear guide disposed parallel with the ball screw to guide the rectilinear motion of the slider. The ball screw and the linear guide are connected by the medium of the slider.

A wire is connected to the slider, and thus moves according to the rectilinear motion of the slider. A joint is rotated by moving the wire, and thus a link connected to the joint is operated.

However, torsion is applied to the driving force transmission unit in the direction of force, inversely applied to the driving force transmission unit. Since the ball screw is separated from a screw axis by a designated distance, when the ball screw receives force from a long distance, torsion as well as force for the rectilinear motion is applied to the ball screw. Due to the above torsion, efficiency in force reflection and back-drivability of the actuator are lowered.

Further, in order to withstand torsion, sizes of the ball screw and the linear guide in the driving force transmission unit are increased, and design of the actuator is hampered by many restrictions.

Moreover, machining accuracy of the ball screw and the linear guide of the driving force transmission unit needs to be increased to accurately assemble the two parts, and conventionally, assembly performance of the two parts is lowered.

SUMMARY

Therefore, it is one aspect of the example embodiments to provide a robot actuator, in which efficiency in force reflection and back-drivability is improved, and a humanoid robot having the same.

It is another aspect of the example embodiments to provide a robot actuator which is efficiently and accurately assembled, and a humanoid robot having the same.

Additional aspects will be set forth in part in the description which follows and, in part, will be apparent from the description, or may be learned by practice of the disclosure.

The foregoing and/or other aspects are achieved by providing a robot actuator including a rotation driving source, a ball screw member including a ball screw part connected to the rotation driving source, and a nut part connected to the ball screw part, a guide member separated in parallel from the ball screw part, a slider member movably supported by the guide member, and a connection member connecting the slider member and the nut part to move the slider member in connection with the nut part, wherein the connection member is relatively movably connected to at least one of the nut part and the slider member.

The connection member may include a first part connected to the slider member and a second part extended from the first part to one side and connected to the nut part, and at least one of the first part and the second part may be relatively rotatably connected to one of the slider member and the nut part.

First shafts relatively rotated against the slider member may be provided on the first part.

A first intermediate member including protrusion parts may be fixed to the slider member, and first shafts relatively rotated against the first part may be formed on the protrusion parts.

Second shafts relatively rotated against the nut part may be provided on the second part.

A first intermediate member including protrusion parts may be fixed to the slider member, and first shaft reception recesses, to which the first shafts are pivotally connected, may be formed on the protrusion parts.

The second shafts may be pivotally connected to second shaft reception recesses of the nut part.

The first shafts may be cylindrical pivot pins, and the first shaft reception recesses may be C-shaped recesses and the first shafts inserted into the first shaft reception recesses.

The second shafts may be cylindrical pivot pins, and the second shaft reception recesses may be cylindrical recesses and the second shafts inserted into the second shaft reception recesses.

First shaft reception recesses, into which the first shafts are inserted, may be provided on the connection member, and the first shaft reception recesses may be formed by symmetrical V-shaped side walls that the rod-shaped first shafts pivotally connected thereto.

The foregoing and/or other aspects are achieved by providing a humanoid robot including a robot arm, a robot hand including finger joints, and actuators and power transmission members to drive the finger joints, wherein each of the actuators includes a rotation driving source, a ball screw member including a ball screw part connected to the rotation driving source and a nut part connected to the ball screw part, a guide member separated in parallel from the ball screw part, a slider member movably supported by the guide member, and a connection member connecting the slider member and the nut part to move the slider member in connection with movement of the nut part, and the connection member is relatively movably connected to at least one of the nut part and the slider member, and force applied to each of the power transmission members is alternately supplied to the slider member and the nut part.

The connection member may include a first part connected to the slider member and a second part extended from the first part to one side and connected to the nut part, and at least one of the first part and the second part may be pivotally connected to one of the slider member and the nut part.

Each of the power transmission members may include a wire connected to the slider member.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
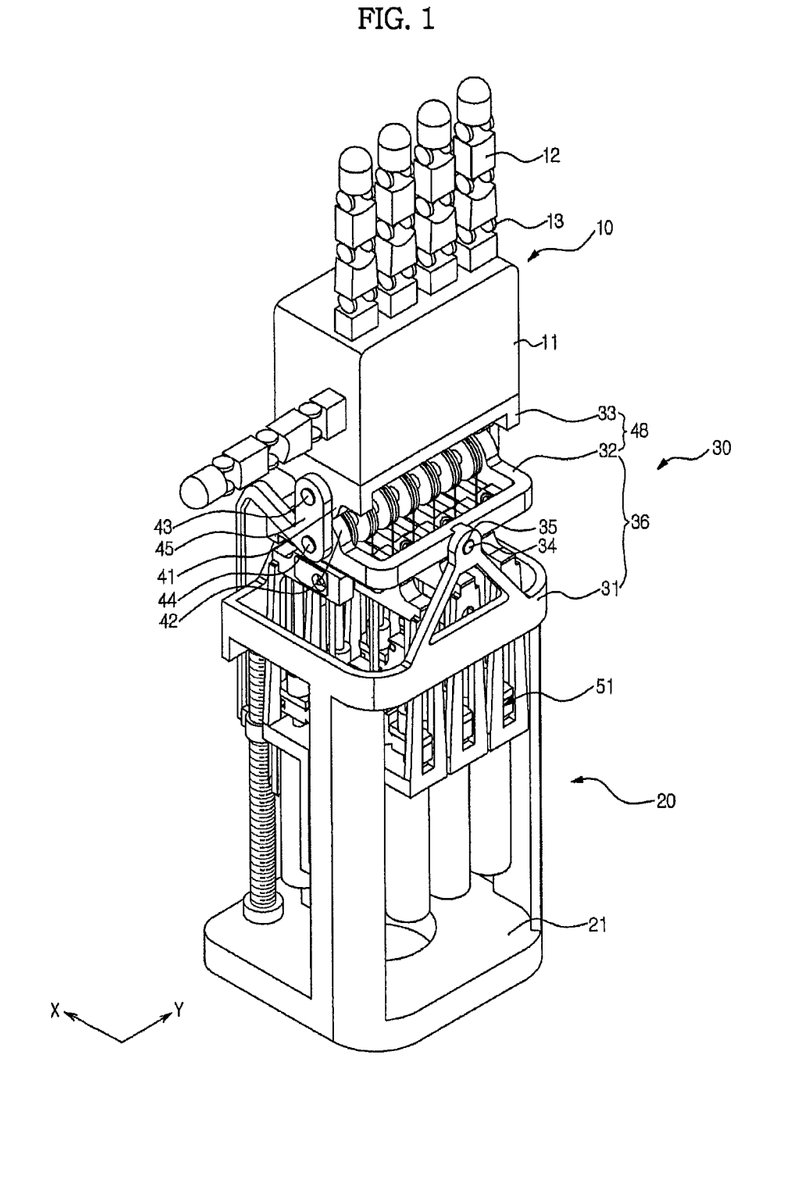
FIG. 1 is a perspective view illustrating a robot hand and a robot arm in accordance with example embodiments.
Figure 2:
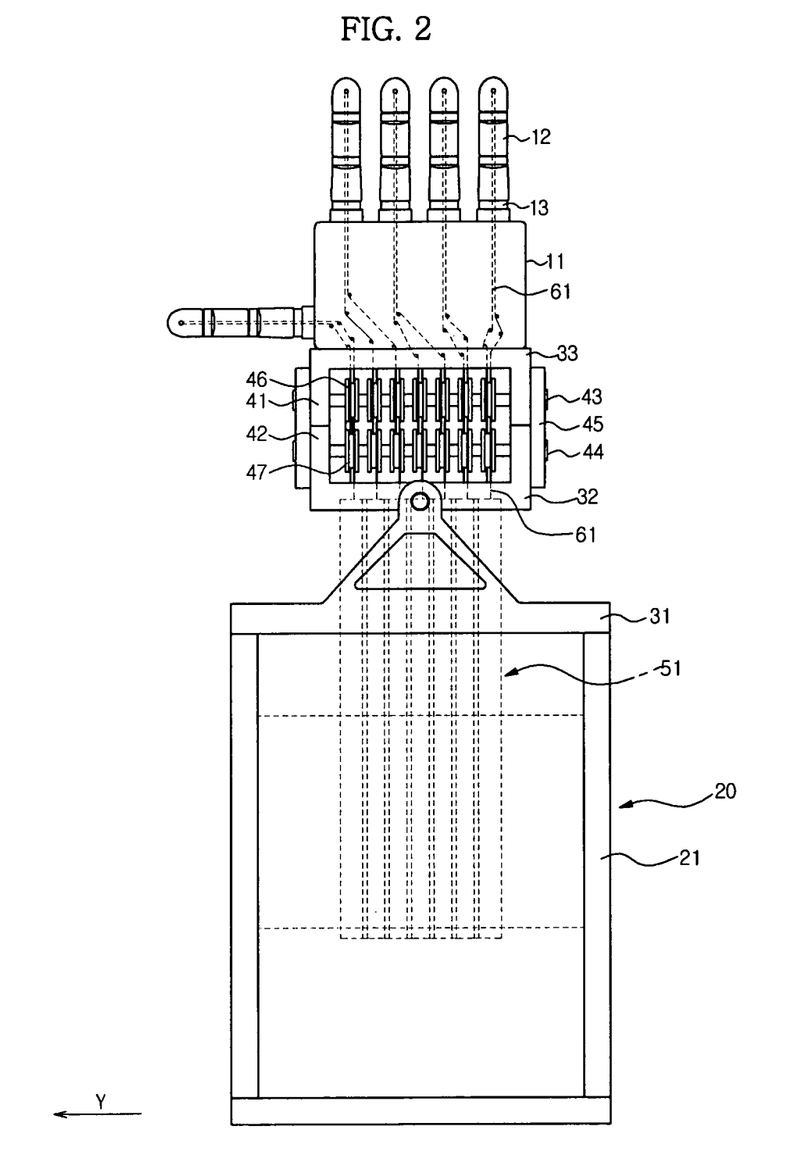
FIGS. 2 and 3 are views illustrating an actuator and a power transmission device in accordance with example embodiments, respectively.
Figure 3:
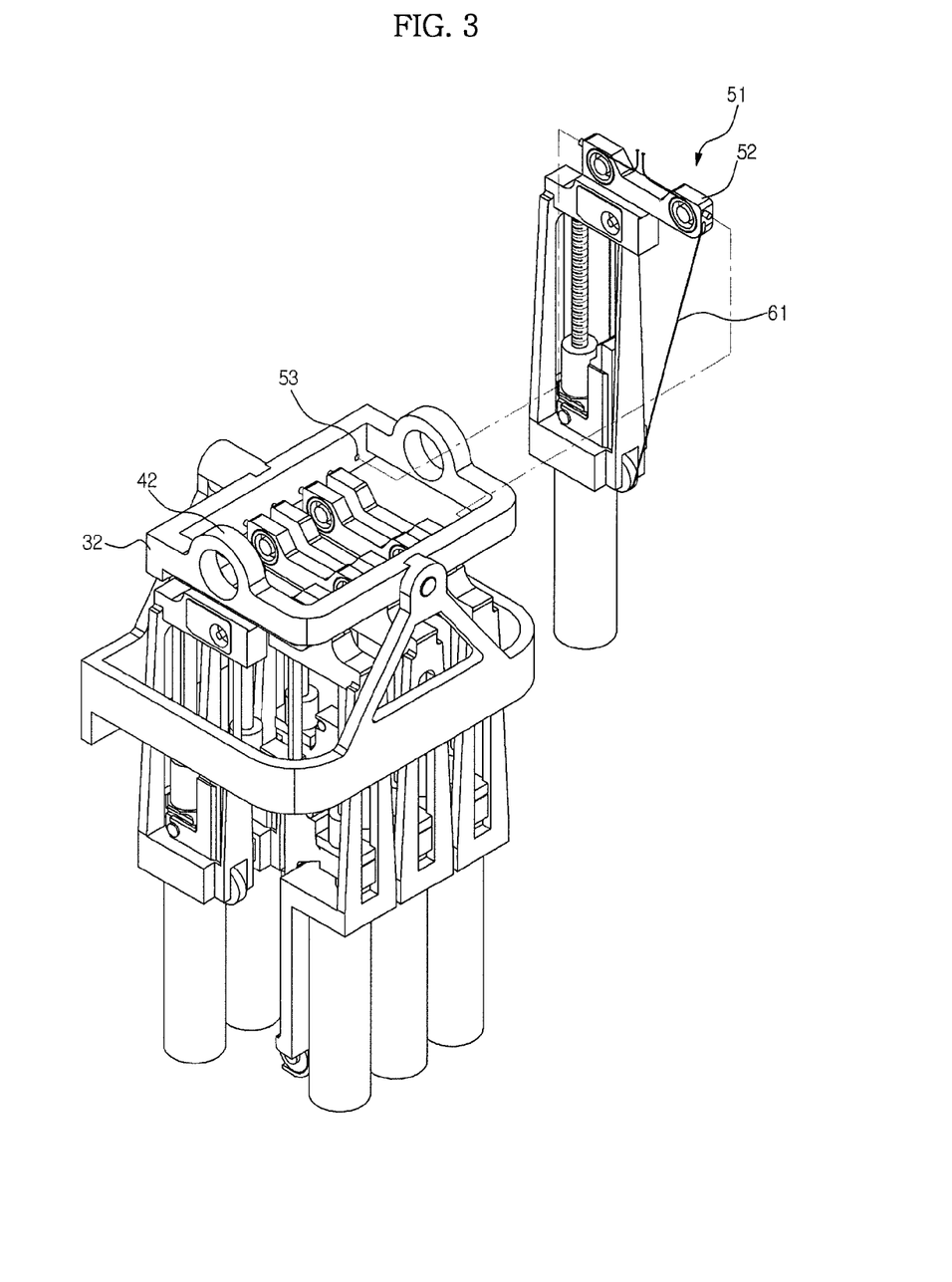

FIG. 1 is a perspective view illustrating a robot hand and a robot arm in accordance with example embodiments, and FIGS. 2 and 3 are views illustrating an actuator and a power transmission device in accordance with example embodiments, respectively.

As shown in FIGS. 1 to 3, a humanoid robot in accordance with example embodiments may include a robot hand 10 and a robot arm 20. A wrist joint unit 30 is provided between the robot hand 10 and the robot arm 20. The robot hand 10 may be rotated in a roll direction (an X-axis direction) and a pitch direction (a Y-axis direction) against the robot arm 20 according to driving of the wrist joint unit 30.

The robot arm 20 may include a forearm member 21 and an upper arm member (not shown), which are connected by an elbow joint unit (not shown). FIG. 1 illustrates the forearm member 21 of the robot arm 20.

The robot hand 10 may include a hand main body 11 and finger members 12, and the hand main body 11 and the finger members 12 may be connected by finger joints 13. Further, a plurality of finger members 12 may be provided, and the plural finger members 12 may be respectively connected by the finger joints 13. The finger members 12 may be rotated against the hand main body 11 according to driving of the finger joints 13.

The wrist joint unit 30 may include a stationary frame 31, a pitch-directional frame 32, and a roll-directional frame 33. The robot hand 10 may be rotated in the pitch direction against the robot arm 20 according to rotation of the pitch-directional frame 32 against the stationary frame 31, and the robot hand 10 may be rotated in the roll direction against the robot arm 20 according to rotation of the roll-directional frame 33 against the pitch-directional frame 32.

The stationary frame 31 may be connected to the front arm member 21. Here, the stationary frame 31 may be formed integrally with the front arm member 21.

The pitch-directional frame 32 may be rotatably connected to the stationary frame 31. Both ends of a shaft part 34 of the pitch-directional frame 32 may be inserted into hole parts 35 of the stationary frame 31. The pitch-directional frame 32 and the stationary frame 31 may form a pitch-directional wrist joint 36. If the pitch-directional wrist joint 36 is driven, the robot hand 10 may be rotated in the pitch direction (the Y-axis direction) against the robot arm 20.

The roll-directional frame 33 is rotatably connected to the pitch-directional frame 32. A first roll part 41 of the roll-directional frame 33 may contact a second roll part 42 of the pitch-directional frame 32, and a first rotary shaft 43 of the roll-directional frame 33 and a second rotary shaft 44 of the pitch-directional frame 32 may be connected by a connection member 45. If the connection member 45 is rotated on the second rotary shaft 44, the first roll part 41 may roll on the second roll part 42 while generating rolling friction. A plurality of first rollers 46 may be installed on the first rotary shaft 43, and a plurality of second rollers 47 may be installed on the second rotary shaft 44. Power transmission members 61 may be respectively connected to the first rollers 46 and the second rollers 47.

The roll-directional frame 33 and the pitch-directional frame 32 may form a roll-directional wrist joint 48. If the roll-directional wrist joint 48 is driven, the robot hand 10 may be rotated in the roll direction (the X-axis direction) against the robot arm 20. Further, the roll-directional frame 33 may be connected to the hand main body 11. Here, the roll-directional frame 33 may be formed integrally with the hand main body 11. Actuator 51 respectively drives the finger joints 13 and may be provided on the robot arm 20.

The actuator 51 in accordance with example embodiments may be installed on the pitch-directional frame 32. Both ends of a shaft part 52 of the actuator 51 may be inserted into recess parts 53 of the pitch-directional frame 32. If the pitch-directional frame 32 is rotated against the stationary frame 31, the actuator 51 may move in connection with the pitch-directional frame 32. A regular interval between the actuator 51 and the pitch-directional frame 32 may be kept.

The power transmission member 61 includes a wire 61, and the wire 61 transmits driving force of the actuator 51 to the finger joint 13. The wire 61 connects the actuator 51 and the finger joint 13, and passes through the wrist joint unit 30. The wire 61 passes through the pitch-directional wrist joint 36 and the roll-directional wrist joint 48, and particularly, while the wire 61 passes through the roll-directional wrist joint 48, the wire 61 may be alternately wound on the first roller 46 and the second roller 47. As described above, if the wire 61 passes through the pitch-directional wrist joint 36 and the roll-directional wrist joint 48, the length of the wire 61 connecting the actuator 51 and the finger joint 13 is kept uniform even when the pitch-directional wrist joint 36 and the roll-directional wrist joint 48 are operated. Although the wrist joint unit 30 is operated, the finger joint 13 may not be driven unless the length of the wire 61 connecting the actuator 51 and the finger joint 13 is changed. Therefore, the wrist joint 30 and the finger joint 13 may be driven independently.

Figure 4:
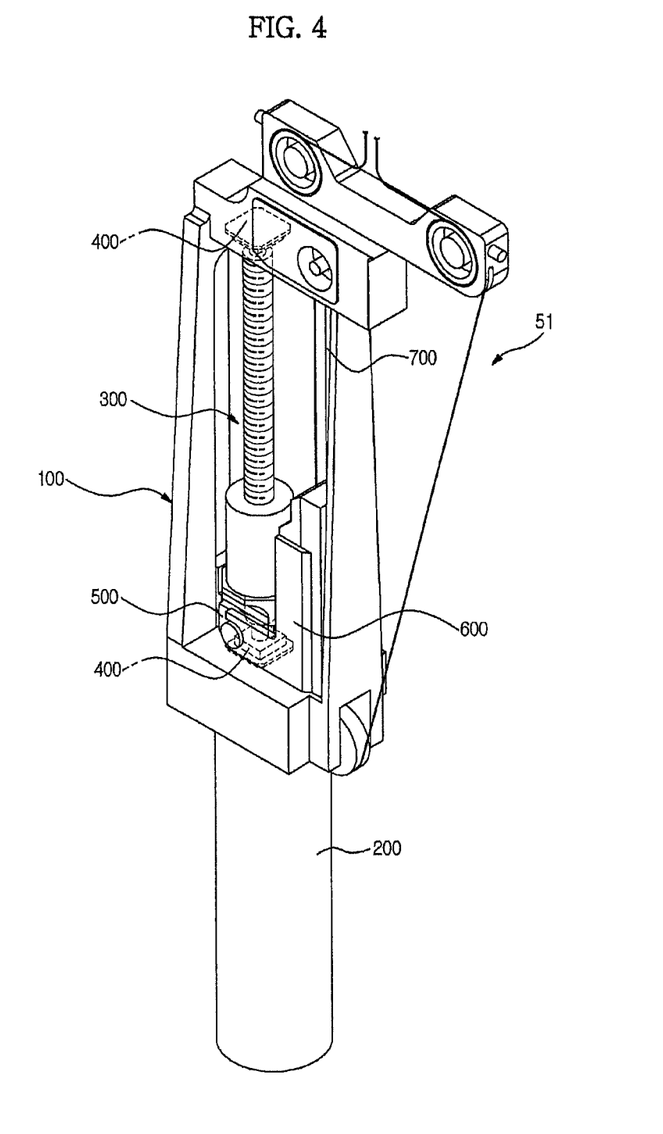
FIG. 4 is a view illustrating the actuator in accordance with example embodiments.
Figure 5:
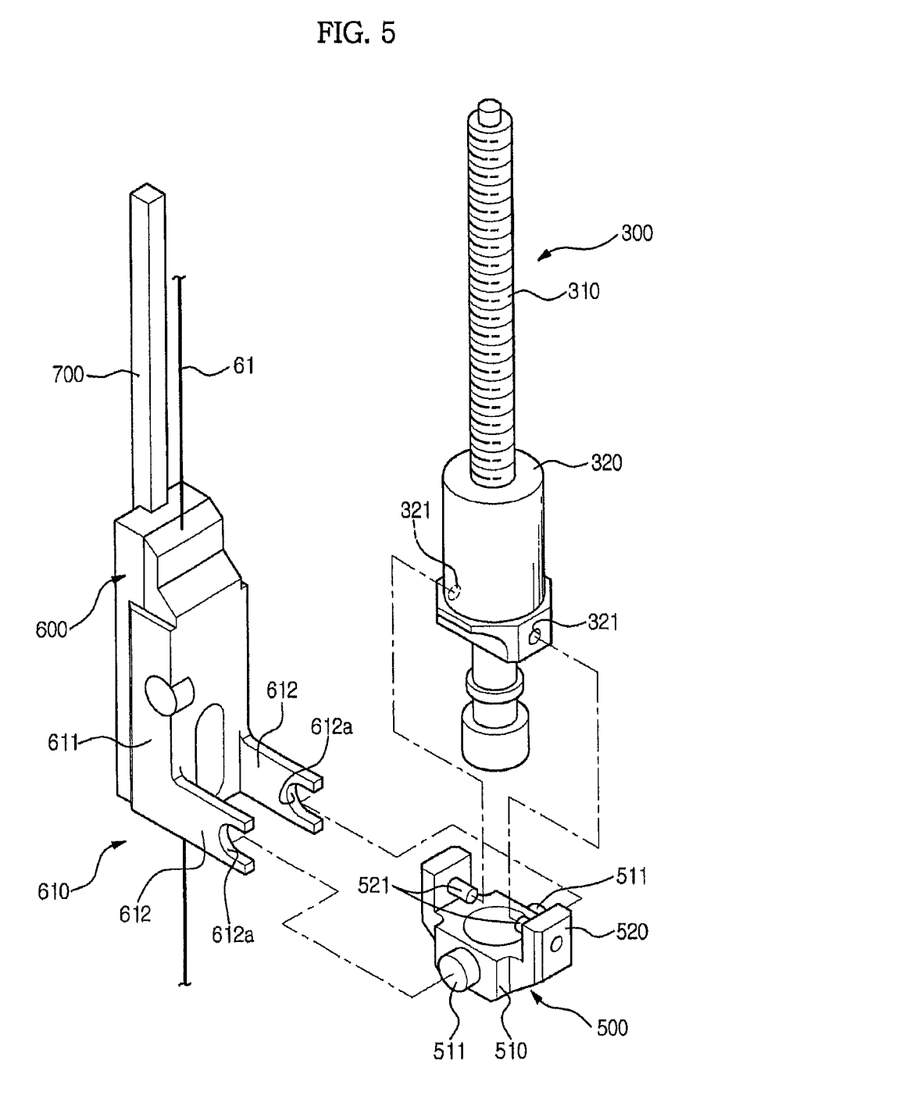
FIG. 5 is an exploded perspective view of a part of the actuator in accordance with example embodiments.

FIG. 4 is a view illustrating the actuator in accordance with example embodiments, and FIG. 5 is an exploded perspective view of a part of the actuator of FIG. 5.

As shown in FIGS. 4 and 5, the actuator 51 in accordance with example embodiments may include an actuator housing 100, a rotation driving source 200, a ball screw member 300, bearing members 400, a connection member 500, a slider member 600, and a linear guide member 700.

The rotation driving source 200 may be installed at the outside of the actuator housing 100. The rotation driving source 200 at one end of the ball screw member 300, which will be described later, rotates a ball screw part 310. Such a rotation driving source 200 may include a servomotor.

The ball screw member 300 is installed within the actuator housing 100 and converts rotation driving force of the rotation driving source 200 into a rectilinear motion to be transmitted to the slider member 600.

The ball screw member 300 may include the ball screw part 310. The ball screw part 310 may have thereon a screw of a designated pitch, extended from the rotation driving source 200, and a ball nut part 320 surrounding a designated region of the ball screw part 310. The ball screw part 310 may be rotated by the rotation driving source 200, and a rotary motion of the ball screw part 310 may be converted into a rectilinear motion of the ball nut part 320.

The bearing members 400 may be fixed to the actuator housing 100 to correspond to the ball screw member 300. Both ends of the ball screw part 310 of the ball screw member 300 may be inserted into the bearing members 400, allowing the ball screw part 310 to be smoothly rotated.

A linear member 700 running parallel with the ball screw member 300 may be installed at one side of the ball screw member 300. The linear guide member 700 serves both to allow the slider member 600 to rectilinearly move in connection with movement of the ball nut part 320 and to guide the ball nut part 320 and move the ball nut part 320 rectilinearly along the ball screw part 310. The linear guide member 700 may be fixed to the actuator housing 100 so that the linear guide member 700 is separated in parallel from the ball screw part 310 by a designated interval.

The slider member 600 is connected to the linear guide member 700 and may be freely rotatably supported by the linear guide member 700. The slider member 600 may rectilinearly move along the linear guide member 700 in connection with the rectilinear motion of the ball nut part 320. Therefore, through interconnection between the ball nut part 320 of the ball screw member 300 and the slider member 600 being supported by the linear guide member 700, the ball nut part 320 may rectilinearly move on the ball screw member 300 and the slider member 600 may rectilinear move on the linear guide member 700 by the driving of the rotation driving source 200.

A first intermediate member 610 may be fixed to the slider member 600, and relatively movably connected to the connection member 500, which will be described later. Although the drawings illustrate that the first intermediate member 610 may be formed separately from the slider member 600, the first intermediate member 610 and the slider member 600 may also be formed integrally.

The first intermediate member 610 and the ball nut part 320 may be connected by the connection member 500. The connection member 500 may connect the first intermediate member 610 and the ball nut part 320 to move the slider member 600 and the ball nut part 320 relative to each other.

The first intermediate member 610 may include a base part 611 fixed to the slider member 600, and protrusion parts 612 protruding from both sides of the edge of the base part 611. Here, the length of the protrusion parts 612 may be directly proportional to a separation interval between the ball screw member 300 and the linear guide member 700. First shaft reception recesses 612a may be formed on both protrusion parts 612, and the first intermediate member 610 may be connected directly to the connection member 500 via the first shaft reception recesses 612a. The first shaft reception recesses 612a are approximately C-shaped.

The connection member 500 includes a body part 510 connected to the first intermediate member 610, and extension parts 520 extended from both sides of the edge of the body part 510. The body part 510 may be connected to the slider member 600 through the first intermediate member 610, and the extension parts 520 may be connected to the ball nut part 320. The connection member 500 may be approximately C-shaped, and connect the first intermediate member 610 and the ball nut part 320.

First shafts 511 connected to the first shaft reception recesses 612a of the protrusion parts 612 may be provided on the body part 510 of the connection member 500. The first shafts 511 may be cylindrical pivot pins, which may be inserted into the first shaft reception recesses 612a of the protrusion parts 612. The member 500 and the slider member 600 may move relative to each other through pivot connection between the first shafts 511 of the body part 510 and the first shaft reception recesses 612a of the protrusions 612.

Second shafts 521 may be provided on the extension parts 520 of the connection member 500. The second shafts 521 may be inserted into second shaft reception recesses 321 formed on the ball nut part 320. The second shafts 521 of the extension parts 520 may be cylindrical pivot pins. The member 500 and the ball nut part 320 may move relative to each other through pivot connection between the second shafts 521 of the extension parts 520 and the second shaft reception recesses 321 of the ball nut part 320.

The first shafts 511 and the second shafts 521 provided on the connection member 500 may intersect each other, preferably at right angles.

Although the drawings illustrate that the second shaft reception recesses 321 are provided on the ball nut part 320, a second intermediate member (not shown) may be fixed to the ball nut part 320 and then the second shaft reception recesses 321 may be formed on the second intermediate member (not shown) such that the second intermediate member may be relatively movably connected to the second shafts 521 of the connection member 500.

With reference to FIGS. 6A, 6B, 7A, and 7B, an operation of the actuator in accordance with example embodiments will be described. First, with reference to FIGS. 6A and 6B, a pivot motion between the slider member 600 and the connection member 500 will be described.

Figure 6A:
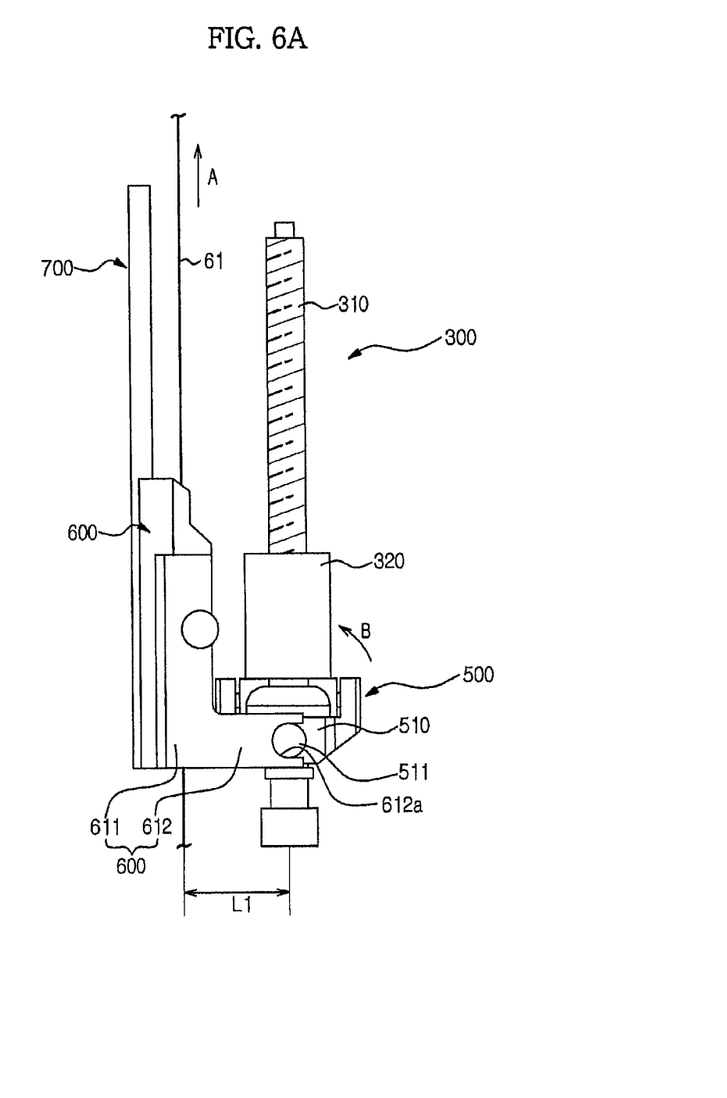
FIGS. 6A and 6B are views illustrating a pivot motion between a slider member and a connection member in accordance with example embodiments.
Figure 6B:
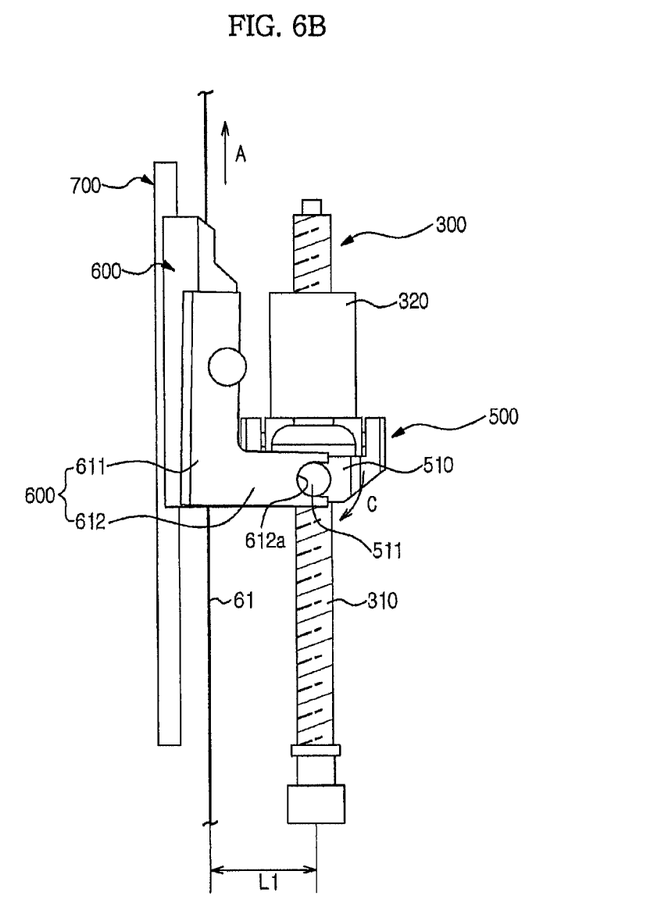

When the wire 61 is pulled in a direction A, the slider member 600 and the first intermediate member 610 may rectilinearly move along the linear guide member 700 in the direction A. Further, the ball nut part 320 may also move rectilinearly along the ball screw part 310 in the direction A in connection with the rectilinear motion of the first intermediate member 610.

However, since the wire 61 is connected to the first intermediate member 610 and the wire 61 is separated from the ball screw part 310 by an interval L1, force applied to the wire 61 in the direction of A may induce torsion of the ball nut part 320 in a direction B. If the torsion of the ball nut part 320 in the direction B is induced by the force applied to the wire 61 in the direction of A, the ball nut part 320 does not move smoothly along the ball screw part 320 in the direction A.

The connection member 500 connecting the first intermediate member 610 and the ball nut part 320 prevents the force applied to the first intermediate member 610 in the direction A which transmitted through the wire 61 from inducing the torsion of the ball nut part 320 in the direction B. As the first intermediate member 610 moves in a direction C relative to the connection member 500, force for a rectilinear motion is transmitted to the ball nut part 320. However, torsion in the direction B is not transmitted to the ball nut part 320.

In more detail, since the ball nut part 320 and the slider member 600 are pivotally connected by the first shafts 511 and the first shaft reception recesses 612a, the first intermediate member 610 may be rotated in the direction C on the first shafts 511 by the force applied to the wire 61 in the direction A.

Therefore, the force applied to the wire 61 in the direction A causes the rotation of the first intermediate member 610 in the direction C between the slider member 600 and the connection member 500, and does not induce the torsion of the ball nut part 320 in the direction B. Therefore, the ball nut part 320 smoothly moves rectilinearly along the ball screw part 310, and efficiency in force reflection and back-drivability of the robot actuator 51 are improved. Accordingly, the actuator 51 achieves current sensing and control due to efficiency in force reflection and back-drivability without installation of an expensive torque sensor, thereby assuring safety of the robot hand 10.

Further, since the ball screw member 300 and the linear guide member 700 need to be disposed parallel with each other, accuracy in assembly of the robot actuator 51 is required. By inserting the first shafts 511 of the connection member 500 into the first shaft reception recesses 612a of the first intermediate member 610, efficient and accurate assembly of the robot actuator 51 is improved.

Figure 7A:
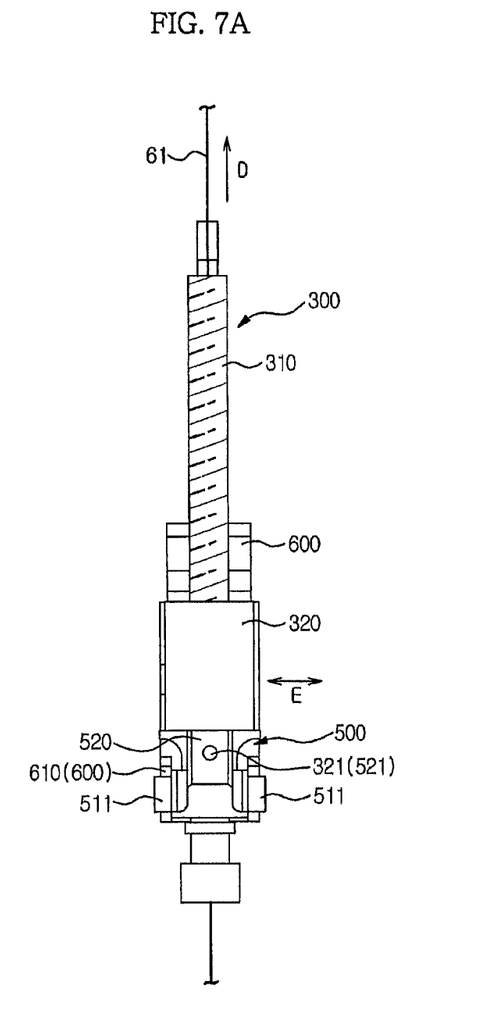
FIGS. 7A and 7B are views illustrating a pivot motion between the connection member and a nut part in accordance with example embodiments.
Figure 7B:
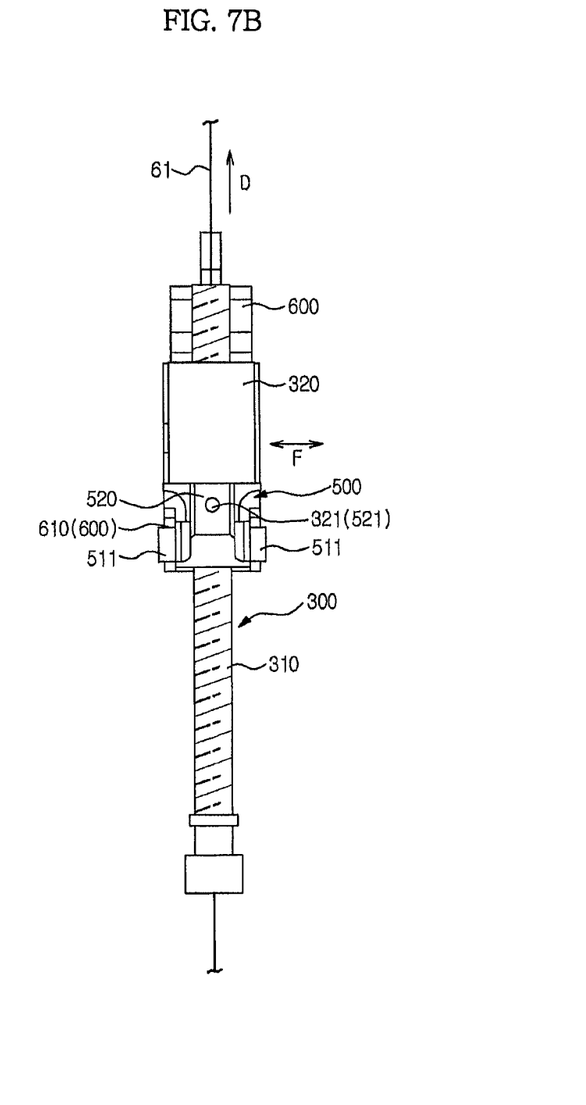

Next, with reference to FIGS. 7A and 7B, a pivot motion between the connection member 500 and the ball nut part 320 will be described.

When the wire 61 is pulled in a direction D, the slider member 600 may rectilinearly move along the linear guide member 700 in the direction D. Further, the ball nut part 320 may rectilinearly move along the ball screw part 310 in the direction D in connection with the rectilinear motion of the first intermediate member 610 in the direction D.

However, if force in the direction D is not applied to the wire 61 on the same plane as the ball screw part 310 and the slider member 600, torsion of the ball nut part 320 in a direction E may be induced, and the ball nut part 320 may not smoothly move rectilinearly.

The connection member 500 connecting the first intermediate member 610 and the ball nut part 320 prevents the force applied to the slider member 600 in the direction D from inducing the torsion of the ball nut part 320 in the direction E. Since the ball nut part 320 and the slider member 600 are pivotally connected by the second shafts 521 and the second shaft reception recesses 321, the slider member 600 may be rotated in a direction F on the second shafts 521 by the force applied to the wire 61 in the direction D.

Therefore, the force applied to the wire 61 in the direction D may not induce the torsion of the ball nut part 320 in the direction E, and the ball nut part 320 may smoothly move rectilinearly along the ball screw part 310.

Figure 8:
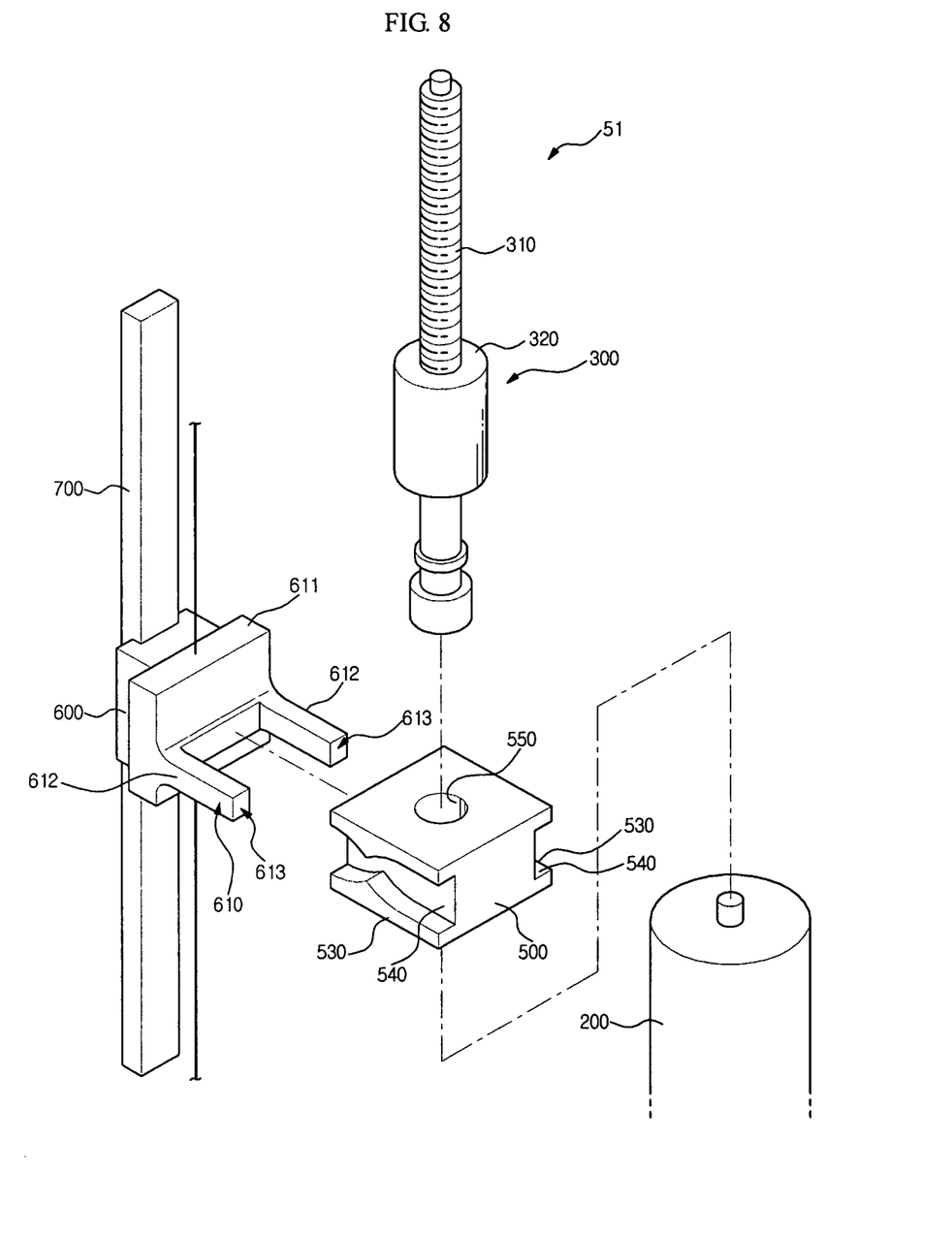
FIG. 8 is a view illustrating an actuator in accordance with example embodiments.

Hereinafter, example embodiments will be described with reference to FIG. 8. Some reference numerals t, which are substantially the same as those previously discussed, are denoted by the same reference numerals even though they are depicted in different drawings, and a detailed description thereof will thus be omitted because it is considered to be unnecessary. FIG. 8 is a view illustrating an actuator in accordance with example embodiments.

As shown in FIG. 8, the actuator 51 in accordance with example embodiments includes a rotation driving source 200, a ball screw member 300, a connection member 500, a slider member 600, a first intermediate member 610, and a linear guide member 700.

The first intermediate member 610 of the actuator 51 in accordance with this embodiment includes a base member 611 connected to the slider member 600, and protrusion parts 613 protruding from both sides of the edge of the base part 611 and connected to the connection member 500.

The connection member 500 includes a first part 530 connected to the first intermediate member 610, and a second part 550 extended from the first part 530 to one side and connected to the ball nut part 320. Therefore, since the connection member 500 is connected to the ball nut part 320 of the ball screw member 300 and the protrusion parts 613 of the first intermediate member 610, the slider member 600 may move in connection with movement of the ball nut part 320.

The protrusion parts 613 of the first intermediate member 610 are provided with first shafts 612, and the first part 530 of the connection member 500 is provided with first shaft reception recesses 540 to receive the first shafts 612. The first shaft reception recesses 540 respectively form point contacts with both sides of the first shafts 612, and thus the first shafts 612 may be relatively be rotated within the first shaft reception recesses 540.

Preferably, the first shafts 612 are rod-shaped, and the first shaft reception recesses 540 are formed by symmetrical V-shaped side walls. The first shafts 612 are inserted into the first shaft reception recesses 540.

Therefore, although the slider member 600 moves rectilinearly along the linear guide member 700 by the wire 61, the ball nut part 320 may move rectilinearly along the ball screw part 310 without torsion through interaction between the first shafts 612 of the first intermediate member 610 and the first shaft reception recesses 540 of the connection member 500. Efficiency in force reflection and back-drivability of the actuator 51 is improved.

As is apparent from the above description, in a robot actuator and a humanoid robot having the same in accordance with example embodiments, efficiency in force reflection and back-drivability is improved, and accuracy in assembly is improved.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A robot actuator, comprising:
   a rotation driving source;
   a ball screw member including a ball screw part connected to the rotation driving source, and a nut part connected to the ball screw part;
   a guide member separated in parallel from the ball screw part;
   a slider member movably supported by the guide member; and
   a connection member connecting the slider member and the nut part to move the slider member in connection with movement of the nut part,
   wherein the connection member is relatively pivotally connected to at least one of the nut part and the slider member, and
   wherein a first intermediate member including two protrusion parts is fixed to the slider member, an end of each of the protrusion parts being formed as a semicircular recess to engage the connection member.

2. The robot actuator according to claim 1, wherein:
   the connection member includes a first part connected to the slider member, and a second part extended from the first part to one side and connected to the nut part; and at least one of the first part and the second part is relatively rotatably connected to one of the slider member and the nut part.

3. A robot actuator, comprising:
a rotation driving source;
a ball screw member including a ball screw part connected to the rotation driving source, and a nut part connected to the ball screw part;
a guide member separated in parallel from the ball screw part;
a slider member movably supported by the guide member; and
a connection member connecting the slider member and the nut part to move the slider member in connection with movement of the nut part,
wherein the connection member is relatively movably connected to at least one of the nut part and the slider member and the connection member includes a first part connected to the slider member, and a second part extended from the first part to one side and connected to the nut part, and
wherein at least one of the first part and the second part is relatively rotatably connected to one of the slider member and the nut part, and
wherein first shafts relatively rotated against the slider member are provided on the first part.

4. The robot actuator according to claim 3, wherein second shafts relatively rotated against the nut part are provided on the second part.

5. The robot actuator according to claim 4, wherein the second shafts are pivotally connected to second shaft reception recesses of the nut part.

6. The robot actuator according to claim 5, wherein:
the second shafts are cylindrical pivot pins; and
the second shaft reception recesses are cylindrical recesses and the second shafts are inserted into the second shaft reception recesses.

7. The robot actuator according to claim 3, wherein:
a first intermediate member including protrusion parts is fixed to the slider member; and
first shaft reception recesses, to which the first shafts are pivotally connected, are formed on the protrusion parts.

8. The robot actuator according to claim 7, wherein:
the first shafts are cylindrical pivot pins; and
the first shaft reception recesses are C-shaped recesses and the first shafts are inserted into the first shaft reception recesses.

9. A robot actuator, comprising:
a rotation driving source;
a ball screw member including a ball screw part connected to the rotation driving source, and a nut part connected to the ball screw part;
a guide member separated in parallel from the ball screw part;
a slider member movably supported by the guide member; and
a connection member connecting the slider member and the nut part to move the slider member in connection with movement of the nut part,
wherein the connection member is relatively movably connected to at least one of the nut part and the slider member and the connection member includes a first part connected to the slider member, and a second part extended from the first part to one side and connected to the nut part, and
wherein at least one of the first part and the second part is relatively rotatably connected to one of the slider member and the nut part, and
wherein:
a first intermediate member including protrusion parts is fixed to the slider member; and
first shafts relatively rotated against the first part are formed on the protrusion parts.

10. The robot actuator according to claim 9, wherein:
first shaft reception recesses, into which the first shafts are inserted, are provided on the connection member; and
the first shaft reception recesses are formed by symmetrical V-shaped side walls to which the first shafts are pivotally connected,
wherein the first shafts are rod-shaped.

11. A humanoid robot, comprising:
a robot arm;
a robot hand including finger joints; and
actuators and power transmission members to drive the finger joints, wherein:
each of the actuators includes a rotation driving source, a ball screw member including a ball screw part connected to the rotation driving source and a nut part connected to the ball screw part, a guide member separated in parallel from the ball screw part, a slider member movably supported by the guide member, and a connection member connecting the slider member and the nut part to move the slider member in connection with movement of the nut part; and
the connection member is relatively pivotally connected to at least one of the nut part and the slider member, and force applied to each of the power transmission members is alternately supplied to the slider member and the nut part,
wherein a first intermediate member including two protrusion parts is fixed to the slider member, and
wherein the connection member comprises shaft reception recesses on two sides of the connection member to receive the two protrusion parts.

12. The humanoid robot according to claim 11, wherein:
the connection member includes a first part connected to the slider member, and a second part extended from the first part to one side and connected to the nut part; and
at least one of the first part and the second part is pivotally connected to one of the slider member and the nut part.

13. The humanoid robot according to claim 11, wherein each of the power transmission members includes a wire connected to the slider member.

* * * * *